Patented Nov. 10, 1931

1,830,903

UNITED STATES PATENT OFFICE

HARRISON P. HOOD, OF CORNING, NEW YORK, ASSIGNOR TO CORNING GLASS WORKS, OF CORNING, NEW YORK, A CORPORATION OF NEW YORK

SUBSTANCE TRANSPARENT TO ULTRA-VIOLET LIGHT AND METHOD OF PRODUCING THE SAME

No Drawing. Application filed October 14, 1925. Serial No. 62,468.

It has heretofore been believed that only certain selected substances are transparent to ultra violet rays. Quartz and the so-called quartz glass (fused quartz) were among these. While glasses of special composition have also been found to possess the property to a greater or less extent, the transmission has been attributed to the basic composition of the glasses.

As the result of an exhaustive investigation I have discovered that ultra violet transmission is the property of many glasses and with certain possible exceptions is not dependent on the basic composition, but on the absence from the glass of ferric salts, and salts of titanium, and that exceedingly minute quantities of these will cause a glass otherwise transparent to the ultra violet to become absorbent thereof.

My investigations along this line started from my discovery that a specimen of a certain calcium phosphate glass had high ultra violet transmission. Accepting the general belief as before stated, this was judged to be due to the fact that calcium phosphates were among the substances having ultra violet transmission, and an attempt was made to make more of the same glass. Unexpectedly it was found that the new melt had a much higher ultra violet absorption than the sample piece. It was decided that the difference was due to the fact that the sample had been melted in a graphite crucible, whereas this new melt had been melted in a clay one.

Accordingly a number of new melts were made in graphite, some being satisfactory in ultra violet transmission and others unsatisfactory. A study of the conditions under which these melts were made led to the belief that traces of ferric salts caused the absorption because when the glass was properly reduced it was transparent to the ultra violet. In making larger melts absorption was again encountered and the condition of the melts was such that ferric salts could not be present. After many more preparations it became evident that titanium oxide was present in the glasses through slight corrosion of the porcelain pots and that this caused the second source of trouble.

I then conceived the idea that the absorption of the ultra violet in many types of glasses is due to titanium and ferric oxides, and this discovery has been confirmed by many trial melts I have made with different types of glasses. Further work was then undertaken to determine the possibility of obtaining as an article of commerce, and not as a laboratory experiment, glasses sufficiently free of such salts. The difficulties of this will be understood when it is known that the presence in certain glasses of ferric salts in amounts varying with the composition of the glass, equal to .020 of one per cent to .055 of one per cent or, in a certain glass, of a salt of titanium equal to .05 of one per cent, prevented transmission of rays appreciably shorter than 300 millimicrons in glasses having a thickness of 4 mm., and that more or less iron is generally contained in the usual batch materials and that titanium and iron salts are always present in the clay refractories in which glass is melted. Even porcelain crucibles contain as much as .6 of one per cent of titanium oxide and .1 of one per cent of ferric oxide. These refractories are attacked by the molten glasses which thereby become contaminated.

Much smaller quantities of ferric and titanium salts will prevent the transmission of shorter waves. Thus, in the glasses which, with .020 of one per cent of ferric oxide or .05 of one per cent of titanium salts, will transmit waves of 300 millimicrons or over, the respective percentages must be reduced to .015 of one per cent and .004 of one per cent respectively to transmit down to 250 millimicrons.

The values for the limits of ultra-violet transmission used herein were obtained by means of a quartz spectrograph, obtaining spectrograms of the transmission of each glass on Banner X plates with exposures of 10 seconds to an iron arc, 110 volts at 6 amperes. The slit on the spectrograph was so placed that the iron lines at 215 millimicrons were barely visible on the plate which was exposed for 10 seconds to the free arc.

As specific examples of glasses having high ultra violet transmission falling within this invention the following are given:

*Phosphate glasses.*—As above stated a phosphate glass furnished the starting point of my investigation and this has been more thoroughly studied than any other, both for this reason and because of the fairly high solubility of the original salt in water, which facilitates purification, and the relatively high stability of the glass made from the same.

C. P. mono calcium phosphate was used as the raw material, the manufacturer's analyses of two lots of this showing the following concentration of impurities:

|  | Per cent | Per cent |
|---|---|---|
| Fe | .005 | .001 |
| Sulphates | .05 | .03 |
| Cl | .005 | .002 |
| As | Trace | |
| Mg |  | .005 |
| Ba |  | .001 |

Whether or not these analyses for iron are correct, the materials contain too much ferric oxide for 4 mm. thickness of the resultant glass to transmit rays shorter than 310 millimicrons when melted under the usual oxidizing conditions. When melted and treated with a reducing agent, such as hydrogen or a carbon compound, glasses transmitting at least as far as 217 millimicrons, and undoubtedly further, were obtained, provided no impurities were introduced during melting.

In spite of the above mentioned advantages of mono calcium phosphate it proved to be very difficult to greatly reduce the iron content of C. P. mono calcium phosphate with satisfactory results. It is much easier to keep the iron content as low as may be, reduce it to a ferrous condition during the melting, and prevent its oxidation during subsequent treating.

The pot or crucible in which the melt is made is another important factor. Ordinary clay crucibles are useless because, even though the corrosion of the phosphate glass is slight, enough titanium and ferric oxides are introduced to cause absorption. Reduction of titanium oxide is fairly difficult and of very little use. Porcelain crucibles can be used for small melts if care is taken in controlling the temperature of the melt, which must be uniform, to minimize convection, and no higher than necessary. Graphite containers can not be used for anything but very small melts due to excessive reduction. After a certain period of contact between phosphate glass and graphite, phosphorous pentoxide is reduced, volatilizing out as free phosphorus and burning in the atmosphere again to phosphorus pentoxide. The increase in lime content due to this loss produces an opal glass, or clear glass streaked with opal, white, amber, or even orange. In the case of reduced phosphates platinum is out of the question. The best results have been obtained in fused quartz crucibles.

Excessive exposure of the molten reduced glass to air is to be avoided, due to reoxidation of the ferrous iron. The time required by the usual procedure of casting, however, is not objectionable.

For the production of a phosphate glass I prefer to prepare a batch consisting of 98½% C. P. mono calcium phosphate and 1½% sugar and melt this in a refractory, which is substantially free from titanium and ferric oxides, such as fused quartz, at 1225° C., preferably in a covered crucible. The sugar acts as a reducing agent, but I have found that more than 2 or 3% of sugar tends to cause opalescence. The molten glass may be shaped and annealed in any desired way, as by rolling, and passing directly into a leer, or by casting in a mold, preferably graphite, preheated to about 375° C., and transferring it to a leer whose temperature is about 440° C. as soon as the casting is rigid. If the mold is heated above 500° C. sticking is apt to occur, whereas if its temperature is below 300° C. the glass may be chilled too rapidly. In certain cases I prefer to use an electrically heated insulated mold and allow the glass to cool slowly therein until it reaches about 125° C., at which time it is removed and allowed to cool in the air.

I have found that for a glass produced as above described the ferric oxide content should be .020 of one per cent or less and the titanium oxide content should be .050 of one per cent or less to obtain transmission at 300 millimicrons, and .015 of one per cent and .004 of one per cent respectively to obtain transmission at 250 millimicrons. If boric oxide is added to the above glass, in amounts up to 10% of the total glass, the stability is greatly increased without any deleterious effect on the ultra-violet transmission or visible color.

Boric acid commonly used as a batch material, without treatment, is not suitable for ultra violet transmission glasses, but, by properly reducing the iron in such material both plain boric oxide glass and borate glasses containing as high as 30% soda, and transparent to wave lengths of 217 millimicrons, have been made.

By adding appreciable amounts of the oxides of nickel, cobalt, chromium, vanadium, and uranium to the calcium phosphate glass set forth above, I have found that colored glasses are produced which will transmit down at least 300 millimicrons. As examples of colored glasses which can be made by adding the above oxides to the batch for the calcium phosphate glass set forth above, I will mention the following:

| Visible color | Oxide added | Glasses having a thickness of approximately 4 mm. transmit ultra-violet to— |
|---|---|---|
| | | Mu. |
| Blue | .2% $Co_3O_4$ | 235 |
| Blue | 1.0 $Co_3O_4$ | 238 |
| Blue | 5.0 $Co_3O_4$ | 248 |
| Green | .25 $Cr_2O_3$ | 246 |
| Green | 1.0 $Cr_2O_3$ | 257 |
| Green | 1.0 $U_2O_3$ | 280 |
| Green | .5 $V_2O_3$ | 292 |
| Yellow | .5 NiO | 242 |
| Yellow | 1.0 NiO | 248 |

In the above glasses I have used purified oxides but it will be obvious that unpurified oxides can be used provided the ferric and titanium oxides present in the resulting glass do not exceed the amounts set forth above. A reducing agent, such as sugar, was present in each of these batches.

By adding two or more of the above oxides to the base glass the resulting glass will transmit the portion of the spectrum which is not absorbed by either of the oxides separately. For example, if cobalt and nickel are added to the calcium phosphate base glass, in the proportion of 3% cobalt and 1% nickel, the resulting glass will absorb all the visible light except the extreme red and will transmit the ultra-violet unimpaired.

Generally speaking the addition of the above oxides to other base glasses of the type set forth in this application will produce the same colors as indicated in the above specific examples, but the addition of uranium to a silicate glass gives a yellow glass. Chromic oxide absorbs a band in the ultra-violet from 315 millimicrons to 280 millimicrons, the limits varying somewhat with the concentration of chromic oxide.

The term "melting," as used herein, means the application of heat to the raw materials until the mass approaches homogeneity and also maintaining the mass in a molten condition.

From the figures before given it will be noted that ferric oxide is more detrimental to transmission in the neighborhood of 300 millimicrons and titanium to transmission of shorter lengths. It will be obvious that, if both ferric oxide and titanium oxide are present in the same glass, the maximum allowable percentages indicated above, for each of these impurities separately, must be correspondingly reduced in order to produce the same transmission.

The claims of this application are limited to phosphate glasses. Claims on method of making ultra-violet transmitting glasses or on glasses themselves and not so limited, are made in my other application, Sr. No. 307,395, filed Sept. 21, 1928, which contains much of the disclosure of the application as filed for this patent, including the disclosure of ultra-violet transmitting silicate glasses.

Having thus described my invention what I claim is:

1. A phosphate glass whose ferric oxide content is small and which, in thicknesses of 4 mm., is transparent to light waves shorter than 300 millimicrons.

2. A calcium phosphate glass which, in thicknesses of 4 mm., is transparent to light waves shorter than 300 millimicrons, and containing less than .020 of one per cent of ferric oxide contents.

3. The process of producing a phosphate glass which, in thicknesses of 4 mm., is transparent to light waves shorter than 300 millimicrons which comprises melting the raw material with a reducing agent in a container substantially free from titanium and ferric oxides.

4. The process of producing a calcium phosphate glass which, in thicknesses of 4 mm., is transparent to light waves shorter than 300 millimicrons which comprises melting the raw material with a reducing agent in a container substantially free from titanium and ferric oxides.

5. A calcium phosphate glass which, in thicknesses of 4 mm., is transparent to light waves as short as 250 millimicrons, and containing at least three elements in substantial proportions, its ferric oxide content being less than .015 of one per cent.

6. A calcium phosphate glass which, in thicknesses of 4 mm., is transparent to light waves as short as 250 millimicrons, and containing at least three elements in substantial proportions, its titanium oxide content being less than .004 of one per cent.

7. A colored glass which, in thicknesses of 4 mm., is transparent to light waves shorter than 300 millimicrons, and containing at least three elements in substantial proportions, in addition to a coloring oxide, its ferric oxide contents being less than .055 of one per cent.

8. A colored phosphate glass whose ferric oxide content is small and which, in thicknesses of 4 mm., is transparent to light waves shorter than 300 millimicrons.

9. A glass substantially consisting of a calcium phosphate and boric oxide.

10. A glass substantially consisting of a calcium phosphate and boric oxide and containing only small quantities of iron and titanium oxides.

HARRISON P. HOOD.